United States Patent Office 3,592,587
Patented July 13, 1971

3,592,587
METHOD OF PROCESSING ACID WASTES FROM THE PROCESS OF CHLOROMETHYLATING COPOLYMERS OF STYRENE AND COMPOUNDS OF THE VINYLAROMATIC SERIES
Arkady Borisovich Pashkov, Khoroshevskoe shosse 74, korpus 3, kv. 56, Moscow, U.S.S.R.; Nikolai Mikhailovich Vdovin, Ulitsa Ordzhonikidze 5, kv. 5; and Olga Nikolaevna Voronkova, Ulitsa Dzerzhinskogo 2b, kv. 37, both of Kemerovo, U.S.S.R.; Roza Romanovna Dranovskaya, Stantsia Tarasovka, Voxalny Tupik 46, Moscow, U.S.S.R.; Anatoly Mikhailovich Egorov, Vesennaya ulitsa 19, kv. 104, Kemerovo, U.S.S.R.; Afanasy Filippovich Kljushnev, Dnepropetrovskoi oblasti, ulitsa Kapitanov 4, kv. 66, Dneprodzerzhinsk, U.S.S.R.; Petr Ivanovich Shatrin, Ulitsa Vesennaya 13, kv. 74; Mikhail Yankelevich Zeigman, Sovetsky prospekt 87, kv. 26; and Vyacheslav Patrushev, Ulitsa Vesennaya 19, kv. 5, all of Kemerovo, U.S.S.R.; and Yakov Vulfovich Epshtein, Ulitsa Pervomaiskaya 85, kv. 10, Moscow, U.S.S.R.
No Drawing. Filed July 31, 1968, Ser. No. 748,905
Int. Cl. C01g 9/04; C07c 43/30
U.S. Cl. 23—97  3 Claims

ABSTRACT OF THE DISCLOSURE

A method for processing acid wastes, which consist of monochlorodimethyl ether, hydrochloric acid and salts thereof and which appear as a result of the process of chloromethylating copolymers of styrene and vinylaromatic compounds with monochlorodimethyl ether in the presence of a Friedel-Crafts catalyst, wherein said wastes are treated with an excess of methanol. Next the treated wastes are rectified first at a temperature of 41–44° C. to recover methylal and then at a temperature of 60–70° C. to recover methanol. The still bottoms remaining after rectification may be heated to carbonize organic impurities contained therein, after which the precipitated carbonized impurities are removed, and the remaining still bottoms are evaporated to recover the Friedel-Crafts catalyst.

Method of processing acid wastes from the process of chloromethylating copolymers of styrene and compounds of the vinylaromatic series.

Method of processing acid wastes from the process of chloromethylating copolymers of styrene and compounds of the vinylaromatic series with monochlorodimethyl ether in the presence of a Friedel-Crafts catalyst, wherein said wastes are treated with methanol after which they are rectified; the still bottoms remaining after rectification are heated to carbonize organic compounds contained therein, precipitated carbonized impurities removed and the solution evaporated.

The present invention relates to methods of processing acid wastes produced in the process of chloromethylating copolymers of styrene and compounds of the vinylaromatic series with monochlorodimethyl ether in the presence of a Friedel-Crafts catalyst.

A method is known for processing said acid wastes which consist of organic substances, predominantly monochlorodimethyl ether and methylal, hydrochloric acid and its salts, wherein said acid wastes are neutralized with soda, whereupon carbonates are precipitated. The inorganic salts are filtered out and the filtrate is rectified to recover organic substances.

Rectification of the filtrate in the prior art method is made difficult by virtue of the fact that formaldehyde condensation products separate out on the plates of the distillation column which lowers the yield of organic compounds to 65–70%.

It is the object of the present invention to provide a method of processing said acid wastes while avoiding the separation of formaldehyde condensation products on the plates of the distillation column, thus ensuring trouble-free operation of the column, and increasing the yield of organic compounds to 95–98%.

The objects of this invention may be accomplished by providing a method of processing said acid wastes from the process of chloromethylating copolymers of styrene and compounds of the vinylaromatic series by treating said wastes with methanol after which they are rectified. The still bottoms remaining after rectification are processed by heating to carbonize organic impurities, the precipitate of carbonized impurities separated and the remaining solution evaporated.

The method of processing acid wastes from the process of chloromethylating copolymers of styrene and compounds of the vinylaromatic series is embodied in the following manner.

Acid wastes consisting of organic substances, predominantly monochlorodimethyl ether and methylal, and hydrochloric acid and its salts are treated with methanol, preferably taken in excess in respect to the monochlorodimethyl ether. As the result of the interaction of methanol with monochlorodimethyl ether, methylal is formed.

After treatment with methanol the acid wastes are rectified at a temperature of 41–44° C. to recover methylal and then at 60–70° C. to recover methanol.

Methylal can be used for the production of monochlorodimethyl ether and also for washing and swelling chloromethylated copolymers of styrene and compounds of the vinylaromatic series before their amination in the production of anion exchange resins.

Recovered methanol is used for treating more acid wastes.

The still bottoms remaining after rectification which consist of chlorides, hydrochloric acid, organic impurities and water, are heated under diminished pressure to 80–100° C. or under atmospheric pressure to 100–150° C. to carbonize organic impurities. A small amount of 1–2% hydrochloric acid is then added to the still bottoms, after which the precipitated carbonized organic impurities are separated from the solution, e.g. by filtration, and the remaining solution evaporated to recover chlorides which are used as a catalyst in the process of chloromethylation of copolymers of styrene and compounds of the vinylaromatic series by means of monochlorodimethyl ether.

For a better understanding of the present invention the following examples of the processing of acid wastes from the process of chloromethylating copolymers of styrene and divinylbenzene are given by way of illustration.

EXAMPLE 1

To 58 g. of acid wastes from the process of chloromethylating copolymers of styrene and divinylbenzene, consisting of 57% by weight of organic substances, predominantly monochlorodimethyl ether and methylal, 13% by weight of zinc chloride and 30% by weight of hydrochloric acid, are added 39 g. of methanol. The mixture thus obtained is fractionally distilled, collecting the methylal fraction at 41–44° C. and then collecting the methanol fraction at 60–70° C.

The combined yield of methylal and methanol amounts to 92–95% of the organic substances contained in the acid wastes.

29 g. of still bottoms, consisting of 20% by weight of hydrochloric acid, 30% by weight of zinc chloride, 2–5% by weight of organic impurities and 45–48% by weight of water, are heated under atmospheric pressure to 100–150° C. to carbonize the organic impurities. 1–2% hydrochloric acid is then added to give a 50% concentration in respect to zinc chloride. The precipitate of carbonized organic impurities is filtered out. The filtrate is evaporated to give a 98% yield of zinc chloride, close to reagant grade zinc in purity, and not inferior to reagent grade zinc in catalytic activity in the process of chloromethylating copolymers of styrene and compounds of the vinylaromatic series.

EXAMPLE 2

54 tons of acid wastes from the process of chloromethylating copolymers of styrene and divinylbenzene are treated with 17 tons of methanol. The mixture thus obtained is fractionally distilled, collecting the methylal fraction at 41–44° C. in the amount of 31.2 tons and then collecting the methanol fraction at 60–70° C. in the amount of 5.4 tons. The combined yield of methylal and methanol comes to 97% of the total organic substances in the wastes treated with methanol.

What we claim is:

1. A method of processing acid wastes which consist of monochlorodimethyl ether, hydrochloric acid and salts thereof, said acid wastes resulting from the process of chloromethylating copolymers of styrene and compounds of the vinyl aromatic series with monochlorodimethyl ether in the presence of a Friedel-Crafts catalyst, said method comprising treating said acid wastes with an excess of methanol followed by rectifying the thus treated acid wastes first at a temperature of 41–44° C. to recover methylal and then at a temperature of 60–70° C. to recover methanol.

2. A method of processing acid wastes which consist of monochlorodimethyl ether, hydrochloric acid and salts thereof, said acid wastes resulting from the process of chloromethylating copolymers of styrene and compounds of the vinylaromatic series with monochlorodimethyl ether in the presence of a Friedel-Crafts catalyst, said method comprising treating said acid wastes with an excess of methanol followed by rectifying the thus treated acid wastes, first at a temperature of 41–44° C. to recover methylal and then at a temperature of 60–70° C. to recover methanol; heating, after rectification, the still bottoms under reduced pressure and at a temperature of 80–100° C. to carbonize organic impurities contained therein; treating the still bottoms with 1–2% hydrochloric acid; removing the precipitated carbonized impurities, and evaporating the remaining still bottoms to recover the Friedel-Crafts catalyst.

3. A method of processing acid wastes, which consist of monochlorodimethyl ether, hydrochloric acid and salts thereof, said wastes resulting from the process of chloromethylating copolymers of styrene and compounds of the vinylaromatic series with monochlorodimethyl ether in the presence of a Friedel-Crafts catalyst, said method comprising treating said acid wastes with an excess of methanol, followed by rectifying the thus treated acid wastes first at a temperature of 41–44° C. to recover methylal, and then at a temperature of 60–70° C. to recover methanol, heating, after rectification, the still bottoms under atmospheric pressure at a temperature of 100–150° C. to carbonize organic impurities contained therein, treating the still bottoms with 1–2% hydrochloric acid, removing the precipitated carbonized impurities and evaporating the remaining still bottoms to recover the Friedel-Crafts catalyst.

References Cited

UNITED STATES PATENTS

| | | | |
|---|---|---|---|
| 1,566,819 | 12/1925 | Carter | 260—615 |
| 2,663,742 | 12/1953 | Frevel et al. | 260—615 |
| 3,222,262 | 12/1965 | Enk et al. | 260—615X |
| 3,317,613 | 5/1967 | Kunstle et al. | 260—615 |
| 2,694,702 | 11/1954 | Jones | 260—93.5 |
| 3,092,451 | 6/1963 | Vines | 23—97 |
| 3,148,944 | 9/1964 | Van Dijk et al. | 23—97 |
| 3,311,602 | 3/1967 | Raley, Jr. | 260—93.5 |
| 3,361,521 | 1/1968 | Yoshida et al. | 23—97 |
| 3,417,066 | 12/1968 | Corte et al. | 260—93.5X |
| 3,425,990 | 2/1969 | Corte et al. | 260—93.5X |

EDWARD STERN, Primary Examiner

U.S. Cl. X.R.

252—415; 260—88.2, 93.5A, 615A, 643